United States Patent
Chen et al.

(10) Patent No.: US 11,667,757 B2
(45) Date of Patent: Jun. 6, 2023

(54) POLYMER, COMPOSITION, AND POLYSILOXANE-POLYIMIDE MATERIAL THEREOF

(71) Applicant: INDUSTRIAL TECHNOLOGY RESEARCH INSTITUTE, Hsinchu (TW)

(72) Inventors: Dong-Sen Chen, Hsinchu County (TW); Yu-Ju Kuo, Zhubei (TW); Yung-Lung Tseng, Zhubei (TW); Chun-Wei Su, Zhubei (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 217 days.

(21) Appl. No.: 17/139,336

(22) Filed: Dec. 31, 2020

(65) Prior Publication Data
US 2022/0204705 A1     Jun. 30, 2022

(51) Int. Cl.
| C08G 77/455 | (2006.01) |
| C08G 77/16 | (2006.01) |
| C08G 77/18 | (2006.01) |
| C08G 77/20 | (2006.01) |
| C08G 77/24 | (2006.01) |
| C08G 77/26 | (2006.01) |
| C08G 77/00 | (2006.01) |
| C08G 73/10 | (2006.01) |
| C08K 5/00 | (2006.01) |
| C08L 79/08 | (2006.01) |
| C08G 77/12 | (2006.01) |

(52) U.S. Cl.
CPC ....... *C08G 77/455* (2013.01); *C08G 73/1039* (2013.01); *C08G 73/1046* (2013.01); *C08G 73/1064* (2013.01); *C08G 73/1067* (2013.01); *C08G 73/1075* (2013.01); *C08G 73/1085* (2013.01); *C08G 77/12* (2013.01); *C08G 77/16* (2013.01); *C08G 77/18* (2013.01); *C08G 77/20* (2013.01); *C08G 77/24* (2013.01); *C08G 77/26* (2013.01); *C08G 77/80* (2013.01); *C08K 5/0025* (2013.01); *C08L 79/08* (2013.01); *C08L 2201/10* (2013.01); *C08L 2203/20* (2013.01)

(58) Field of Classification Search
CPC ...... C08G 77/455; C08G 73/12; C08G 77/20; C08G 77/14; C08G 77/16; C08G 77/26; C08G 73/106
See application file for complete search history.

(56) References Cited

U.S. PATENT DOCUMENTS

| 4,672,099 A | 6/1987 | Kunimune et al. |
| 6,887,580 B2 | 5/2005 | Tokuhisa et al. |
| 8,445,621 B2 | 5/2013 | Sunaga et al. |
| 10,658,208 B2 | 5/2020 | Liao et al. |
| 2008/0069968 A1 | 3/2008 | Cherkaoui et al. |
| 2008/0236864 A1 | 10/2008 | Haralur |
| 2009/0062479 A1* | 3/2009 | Yoneda ............ C08G 77/455 525/408 |
| 2013/0237040 A1* | 9/2013 | Kakuta ............ B32B 7/12 438/479 |
| 2017/0355825 A1* | 12/2017 | Hattori ............ C09D 7/47 |
| 2018/0215948 A1 | 8/2018 | Kim et al. |
| 2019/0157121 A1 | 5/2019 | Liao et al. |

FOREIGN PATENT DOCUMENTS

| EP | 284 803 A2 * | 10/1988 |
| TW | 201124450 A1 | 7/2011 |

(Continued)

OTHER PUBLICATIONS

Taiwanese Office Action and Search Report for Taiwanese Application No. 109147865, dated Dec. 23, 2021.

(Continued)

*Primary Examiner* — Marc S Zimmer
(74) *Attorney, Agent, or Firm* — Birch, Stewart, Kolasch & Birch, LLP

(57) ABSTRACT

A polymer, a composition, and a polysiloxane-polyimide material thereof are provided. The polymer includes a first repeat unit and a second repeat unit. The first repeat unit has a structure represented by Formula (I) and the second repeat unit has a structure represented by Formula (II)

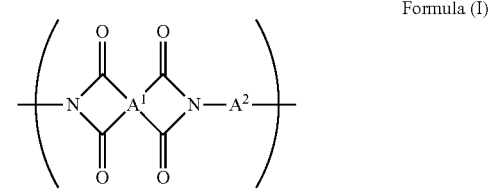

Formula (I)

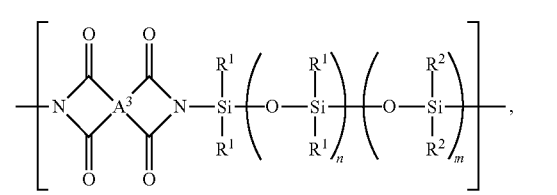

Formula (II)

wherein $A^1$ and $A^3$ are independently tetravalent moiety; $A^2$ is a divalent moiety; $n \geq 1$; $m \geq 1$; $R^1$ is independently hydrogen, $C_{1-8}$ alkyl, $C_{1-8}$ fluoroalkyl, $C_{1-8}$ alkoxy, or $C_{6-12}$ aryl; and $R^2$ is independently hydrogen, $C_{1-8}$ alkyl, $C_{1-8}$ fluoroalkyl, $C_{1-8}$ alkoxy, $C_{6-12}$ aryl, or a reactive functional group.

14 Claims, No Drawings

(56) References Cited

FOREIGN PATENT DOCUMENTS

| | | |
|---|---|---|
| TW | I346691 B | 8/2011 |
| TW | I568774 B | 2/2017 |
| TW | 201941961 A | 11/2019 |

OTHER PUBLICATIONS

Bae et al., "Towards colorless polyimide/silica hybrids for flexible substrates," Polymer, vol. 105, 2016, pp. 124-132, 9 pages total.
Othman et al., "The effects of the Si—O—Si segment presence in BAPP/BPDA polyimide system on morphology and hardness properties for opto-electronic application," Materials & Design, vol. 82, 2015, pp. 98-105, 8 pages total.

\* cited by examiner

POLYMER, COMPOSITION, AND POLYSILOXANE-POLYIMIDE MATERIAL THEREOF

TECHNICAL FIELD

The disclosure is related to a polymer, composition, and polysiloxane-polyimide material thereof.

BACKGROUND

Polyimide has flexibility, sufficient mechanical strength, chemical resistance, and other characteristics, and thus is widely used in various industries such as the plastics industry, the electronics industry, and the aerospace industry.

As display technologies have developed, transparent displays have acquired such advantages as being thin and transparent, and they can combine information on the panel with entities to provide more information. Due to the rise of transparent displays, the need for flexible substrates used as transparent displays has increased in recent years. Polyimide has flexibility and sufficient mechanical strength and is therefore suitable for use as substrates for flexible transparent displays. However, current polyimide substrate materials still have some properties that need to be improved in order to meet people's increasingly stringent requirements for the quality of displays.

SUMMARY

The disclosure provides a polymer. According to embodiments of the disclosure, the polymer includes first repeating unit and second repeating unit. The first repeating unit has a structure represented by Formula (I), and the second repeating unit has a structure represented by Formula (II):

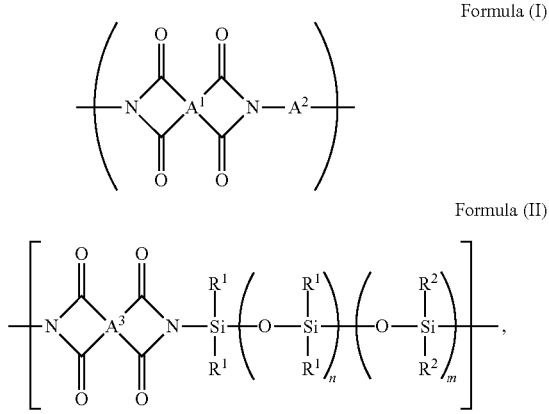

Formula (I)

Formula (II)

wherein $A^1$ and $A^3$ are independently substituted or non-substituted tetravalent $C_6$-$C_{25}$ aryl group, substituted or non-substituted tetravalent $C_4$-$C_8$ cycloalkyl group, substituted or non-substituted tetravalent $C_5$-$C_{25}$ heteroaryl group, substituted or non-substituted tetravalent $C_7$-$C_{25}$ alkylaryl group, substituted or non-substituted tetravalent $C_7$-$C_{25}$ acylaryl group, substituted or non-substituted tetravalent $C_6$-$C_{25}$ aryl ether group, substituted or non-substituted tetravalent $C_7$-$C_{25}$ acyloxyaryl group, or substituted or non-substituted tetravalent $C_6$-$C_{25}$ sulfonylaryl; $A^2$ is substituted or non-substituted $C_6$-$C_{25}$ arylene group, substituted or non-substituted $C_4$-$C_8$ cycloalkylene group, substituted or non-substituted $C_5$-$C_{25}$ heteroarylene group, substituted or non-substituted divalent $C_7$-$C_{25}$ alkylaryl group, substituted or non-substituted divalent $C_7$-$C_{25}$ acylaryl group, substituted or non-substituted divalent $C_6$-$C_{25}$ aryl ether group, substituted or non-substituted divalent $C_7$-$C_{25}$ acyloxyaryl group, or substituted or non-substituted divalent $C_6$-$C_{25}$ sulfonylaryl; n≥1; m≥1; $R^1$ is independently hydrogen, $C_{1-8}$ alkyl group, $C_{1-8}$ fluoroalkyl group, $C_{1-8}$ alkoxy group, or $C_{6-12}$ aryl group; $R^2$ are independently hydrogen, $C_{1-8}$ alkyl group, $C_{1-8}$ fluoroalkyl group, $C_{1-8}$ alkoxy group, $C_{6-12}$ aryl group, hydroxyl group, amine group, $C_{2-8}$ carboxyl group, $C_{2-8}$ alkenyl, amine group, aminoalkyl group, $C_{2-8}$ isocyanate group, alkylamino group, $C_{3-8}$ acrylate group, $C_{4-9}$ methacrylate group, glycidyl group, oxiranyl group, oxetanyl group, or 3,4-epoxycyclohexyl group; and, at least two $R^2$ are hydroxyl group, amine group, $C_{2-8}$ carboxyl group, $C_{2-8}$ alkenyl, amine group, aminoalkyl group, $C_{2-8}$ isocyanate group, alkylamino group, $C_{3-8}$ acrylate group, $C_{4-9}$ methacrylate group, glycidyl group, oxiranyl group, oxetanyl group, or 3,4-epoxycyclohexyl group.

According to embodiments of the disclosure, the disclosure also provides a composition used for preparing a polysiloxane-polyimide material. According to embodiments of the disclosure, the composition includes 100 parts by weight of the polymer of the disclosure; and, 5-40 parts by weight of crosslinking agent.

According to embodiments of the disclosure, the disclosure also provides a polysiloxane-polyimide material, wherein the polysiloxane-polyimide material is a cured product of the composition of the disclosure via a crosslinking reaction.

A detailed description is given in the following embodiments.

DETAILED DESCRIPTION

The polymer, composition, and polysiloxane-polyimide material thereof of the disclosure are described in detail in the following description. In the following detailed description, for purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments. As used herein, the term "about" in quantitative terms refers to plus or minus an amount that is general and reasonable to persons skilled in the art.

As used herein, the term "about" in quantitative terms refers to plus or minus an amount that is general and reasonable to persons skilled in the art.

Moreover, the use of ordinal terms such as "first", "second", "third", etc., in the disclosure to modify an element does not by itself connote any priority, precedence, or order of one claim element over another or the temporal order in which it is formed, but are used merely as labels to distinguish one claim element having a certain name from another element having the same name (but for use of the ordinal term) to distinguish the claim elements.

The disclosure provides a polymer, composition employing the same, and polysiloxane-polyimide material. By introducing a repeating unit having polysiloxanyl group, the polymer of the disclosure has rigid segment and soft segment simultaneously, thereby achieving the effect of stress dispersion. According to embodiments of the disclosure, the polymer is suitable for use in concert with a crosslinking agent (or/and initiator) to prepare the composition of the disclosure. It should be noted that the crosslinking agent can react with the polymer of the disclosure to form a network crosslinking structure, thereby enhancing the structural rigidity of the obtained material and uniformly dispersing the stress of intermolecular or intramolecular chains. As a result, besides high transparency and superior processability, the film prepared from the composition of the disclosure (i.e. polysiloxane-polyimide film) simultaneously exhibits high mechanical properties (hardness and Young's modulus) and flexibility. According to embodiments of the disclosure, the cured product of the composition of the disclosure can be widely applied in display device, optoelectronic device, and wearable device.

According to embodiments of the disclosure, the polymer includes first repeating unit and second repeating unit. the first repeating unit having a structure represented by Formula (I), and the second repeating unit having a structure represented by Formula (II):

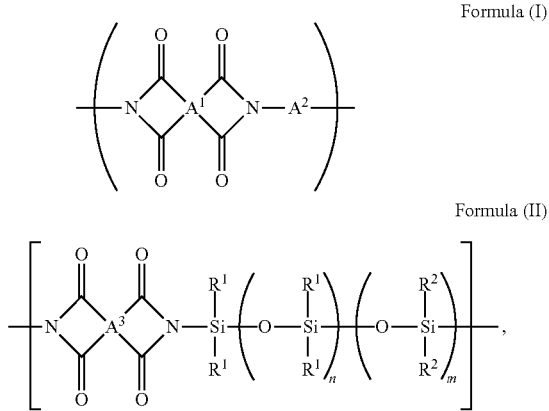

Formula (I)

Formula (II)

wherein $A^1$ and $A^3$ are independently substituted or non-substituted tetravalent $C_6$-$C_{25}$ aryl group, substituted or non-substituted tetravalent $C_4$-$C_8$ cycloalkyl group, substituted or non-substituted tetravalent $C_5$-$C_{25}$ heteroaryl group, substituted or non-substituted tetravalent $C_7$-$C_{25}$ alkylaryl group, substituted or non-substituted tetravalent $C_7$-$C_{25}$ acylaryl group, substituted or non-substituted tetravalent $C_6$-$C_{25}$ aryl ether group, substituted or non-substituted tetravalent $C_7$-$C_{25}$ acyloxyaryl group, or substituted or non-substituted tetravalent $C_6$-$C_{25}$ sulfonylaryl; $A^2$ can be substituted or non-substituted $C_6$-$C_{25}$ arylene group, substituted or non-substituted $C_4$-$C_8$ cycloalkylene group, substituted or non-substituted $C_5$-$C_{25}$ heteroarylene group, substituted or non-substituted divalent $C_7$-$C_{25}$ alkylaryl group, substituted or non-substituted divalent $C_7$-$C_{25}$ acylaryl group, substituted or non-substituted divalent $C_6$-$C_{25}$ aryl ether group, substituted or non-substituted divalent $C_7$-$C_{25}$ acyloxyaryl group, or substituted or non-substituted divalent $C_6$-$C_{25}$ sulfonylaryl; n≥1; m≥1; $R^1$ can be independently hydrogen, $C_{1-8}$ alkyl group, $C_{1-8}$ fluoroalkyl group, $C_{1-8}$ alkoxy group, or $C_{6-12}$ aryl group; and, $R^2$ can be independently hydrogen, $C_{1-8}$ alkyl group, $C_{1-8}$ fluoroalkyl group, $C_{1-8}$ alkoxy group, $C_{6-12}$ aryl group, hydroxyl group, amine group, $C_{2-8}$ carboxyl group, $C_{2-8}$ alkenyl, amine group, aminoalkyl group, $C_{2-8}$ isocyanate group, alkylamino group, $C_{3-8}$ acrylate group, $C_{4-9}$ methacrylate group, glycidyl group, oxiranyl group, oxetanyl group, or 3,4-epoxycyclohexyl group. In order to react the polymer of the disclosure with a crosslinking agent to form a network crosslinking structure, at least two $R^2$ can be reactive functional group. For example, at least two $R^2$ are independently hydroxyl group, amine group, $C_{2-8}$ carboxyl group, $C_{2-8}$ alkenyl, amine group, aminoalkyl group, $C_{2-8}$ isocyanate group, alkylamino group, $C_{3-8}$ acrylate group, $C_{4-9}$ methacrylate group, glycidyl group, oxiranyl group, oxetanyl group, or 3,4-epoxycyclohexyl group. According to embodiments of the disclosure, when two $R^2$ are reactive functional groups, the two $R^2$ can be bonded with the same Si atom or the two $R^2$ can be bonded with distinct Si atoms.

According to embodiments of the disclosure, the number of first repeating unit of the polymer can be 2 to 2,000 (such as 2 to 1,800, 5 to 1,500, or 10 to 1,200), and the number of first repeating unit of the polymer can be 2 to 18,000 (such as 2 to 16000, 5 to 13,500, or 10 to 11,000). According to embodiments of the disclosure, the first repeating unit and the second repeating unit can be arranged in a random or block fashion. According to embodiments of the disclosure, the weight average molecular weight (Mw) of the polymer can be about 5,000 to 300,000, such as 5,000 to 250,000, 5,000 to 200,000, 5,000 to 180,000, or 5,000 to 150,000. The weight average molecular weight (Mw) of oligomer or polymer of the disclosure can be determined by gel permeation chromatography (GPC) based on a polystyrene calibration curve. According to embodiments of the disclosure, the number ratio of the first repeating unit to the second repeating unit can be 95:5 to 75:25, such as 90:10, 85:15, or 80:20. When the number ratio of the first repeating unit to the second repeating unit is too high, the obtained polymer has excessive rigidity segments, resulting in that the cured product of the composition (i.e. polysiloxane-polyimide film) exhibits reduced ductility and flexibility. When the number ratio of the first repeating unit to the second repeating unit is too low, the obtained polymer has excessive soft segment, resulting in that the cured product of the composition exhibits reduced hardness and Young's modulus.

According to embodiments of the disclosure, in the second repeating unit, the moiety of

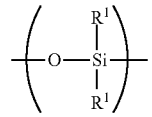

and the moiety of

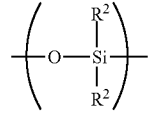

are arranged in a random fashion. According to embodiments of the disclosure, 99≥n≥60, such as 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, or 98; 40≥m≥1, such as 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, or 39. According to embodiments of the disclosure, in order to help the network crosslinking structure prepared from the polymer to simultaneously exhibit good mechanical properties and flexibility, the ratio of n to m can be 3:2 to 99:1. According to embodiments of the disclosure, in the second repeating unit, the molecular weight of moiety of

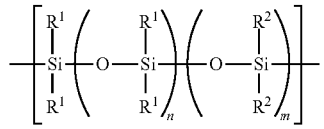

can be 500 to 3,000. When the molecular weight of moiety of

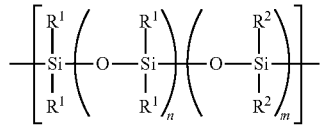

is too high, the cured product prepared from the composition (i.e. polysiloxane-polyimide film) exhibits reduced hardness and Young's modulus.

According to embodiments of the disclosure, when $A^1$ (or/and $A^3$) is a substituted tetravalent group, at least one hydrogen of the tetravalent group (such as the hydrogen bonded with the carbon) can be optionally replaced with fluorine, $C_{1-6}$ alkyl group or $C_{1-6}$ fluoroalkyl group. When $A^2$ is a substituted divalent group, at least one hydrogen of the divalent group (such as the hydrogen bonded with the carbon) can be optionally replaced with fluorine, $C_{1-6}$ alkyl group or $C_{1-6}$ fluoroalkyl group.

According to embodiments of the disclosure, $A^1$ and $A^3$ can be independently

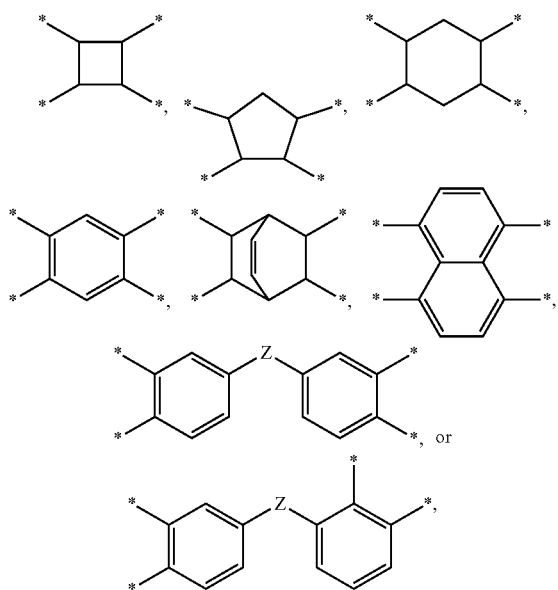

wherein $A^1$ and $A^3$ are connected to carbonyl by the location represented by *; Z is single bond, —O—, —SO$_2$—, —C(CH$_3$)$_2$—, —C(CF$_3$)$_2$—,

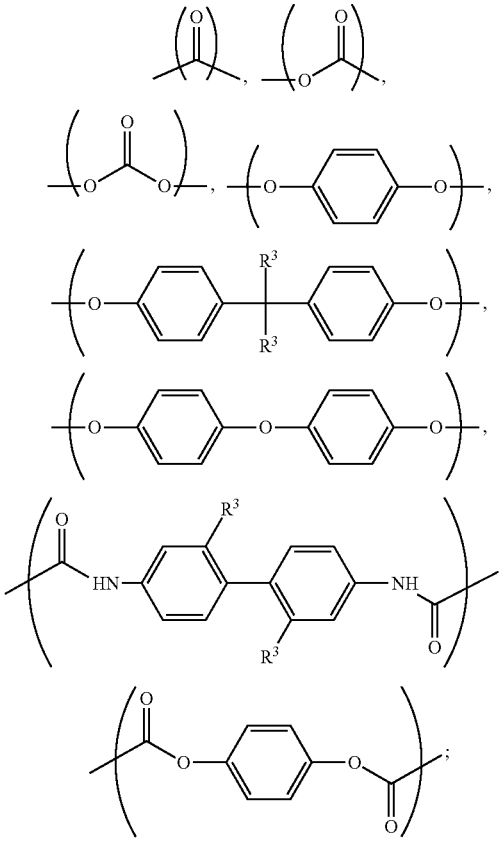

and, $R^3$ can be hydrogen, fluorine $C_{1-6}$ alkyl group, or $C_{1-6}$ fluoroalkyl group.

According to embodiments of the disclosure, $A^2$ can be

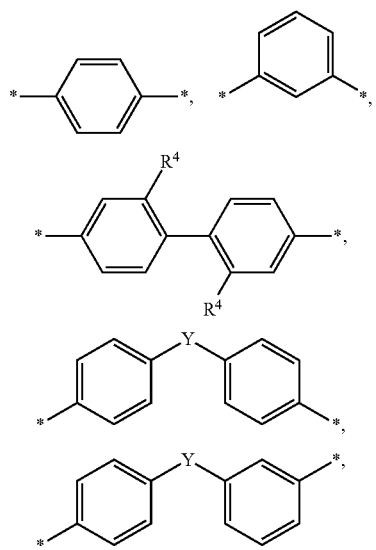

wherein $A^2$ is connected to the nitrogen (nitrogen of the first repeating unit or second repeating unit) by the location represented by *; Y is single bond, —O—, —C(CH$_3$)$_2$—, —C(CF$_3$)$_2$—,

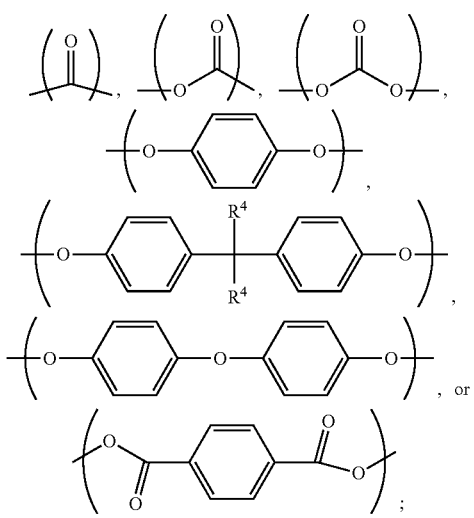

and, $R^4$ can be hydrogen, fluorine $C_{1-6}$ alkyl group, or $C_{1-6}$ fluoroalkyl group.

According to embodiments of the disclosure, the polymer can have a plurality of the first repeating units, and each $A^1$ can be the same or different, and each $A^2$ can be the same or different. The polymer can have a plurality of the second repeating units, and each $A^3$ can be the same or different.

According to embodiments of the disclosure, the $C_{1-8}$ alkyl group can be linear or branched alkyl group. For example, $C_{1-8}$ alkyl group can be methyl, ethyl, propyl, butyl, pentyl, hexyl, heptyl, octyl, or an isomer thereof. According to embodiments of the disclosure, the $C_{1-8}$ fluoroalkyl group can be an alkyl group which a part of or all hydrogen atoms bonded on the carbon atom are replaced with fluorine atoms, and $C_{1-8}$ fluoroalkyl group can be linear or branched, such as fluoromethyl, fluoroethyl, fluoropropyl, fluorobutyl, fluoropentyl, fluorohexyl or an isomer thereof. Herein, fluoromethyl group can be monofluoromethyl group, difluoromethyl group or trifluoromethyl group, and fluoroethyl can be monofluoroethyl group, difluoroethyl group, trifluoroethyl group, tetrafluoroethyl, or perfluoroethyl. According to embodiments of the disclosure, the alkylene group can be linear or branched alkylene group. According to embodiments of the disclosure, the alkenyl group can be linear or branched alkenyl group. According to embodiments of the disclosure, $C_{1-8}$ alkoxy group can be linear or branched alkoxy group. For example, $C_{1-8}$ alkoxy group can be methoxy, ethoxy, propoxy, butoxy, pentoxy, hexoxy, heptoxy, octoxy, or an isomer thereof.

According to embodiments of the disclosure, the polymer preparation of method can include following steps. First, a composition precursor is provided, wherein the composition precursor includes a dianhydride compound, a first diamine and a second diamine. According to embodiments of the disclosure, the composition precursor can further include a solvent such that the dianhydride compound, first diamine, and second diamine are uniformly dispersed in the solvent. Next, the composition precursor is subjected to an imidization, obtaining the polymer of the disclosure. The imidization of the composition precursor includes thermal imidization. The thermal imidization can be performed at 300-500° C. for 4-8 hours, such as performed at 400° C. for 6 hours. According to embodiments of the disclosure, the molar ratio of the dianhydride compound to the first diamine and second diamine can be about 12:1 to 1:1.2. According to embodiments of the disclosure, the molar ratio of the first diamine to the second diamine can be about 95:5 to 75:25 (such as: 90:10, 85:15, or 80:20).

According to embodiments of the disclosure, the dianhydride compound can be

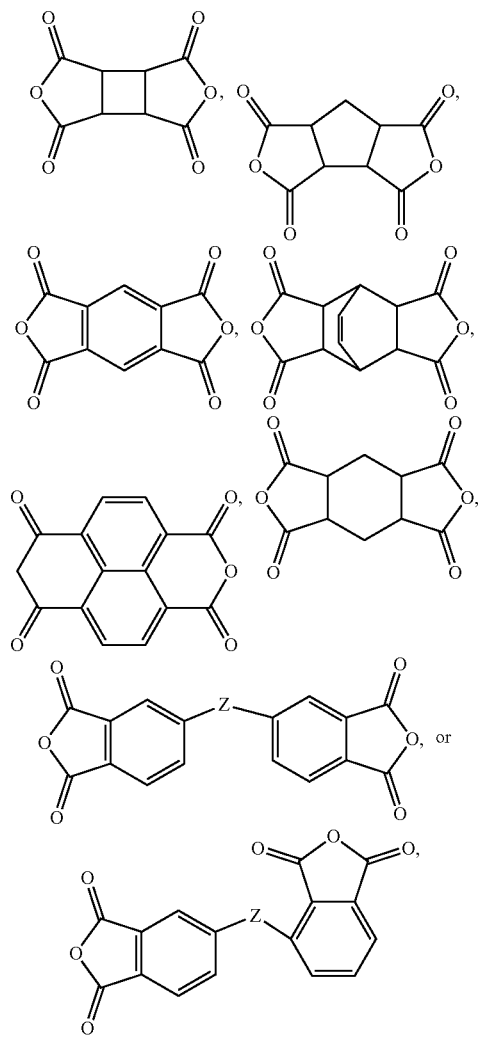

wherein Z is single bond, —O—, —SO$_2$—, —C(CH$_3$)$_2$—, —C(CF$_3$)$_2$—,

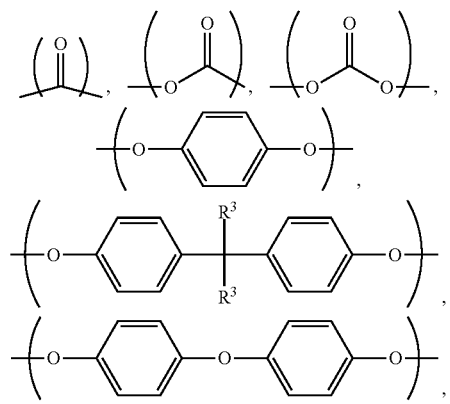

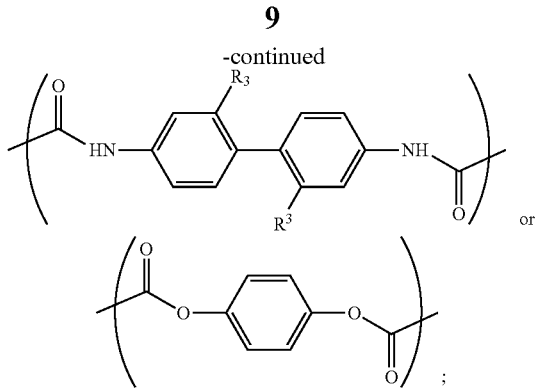

and, $R^3$ is hydrogen, $C_{1-6}$ alkyl group, or $C_{1-6}$ fluoroalkyl group. According to embodiments of the disclosure, the dianhydride compound can be pyromellitic dianhydride (PMDA), hydrogenated pyromellitic dianhydride (H-PMDA), hexafluoroisopropylidene)-diphthalic anhydride (6FDA), 4,4'-oxydiphthalic anhydride (ODPA), 1,3-bis(4-aminophenoxy)benzene (RODA), 4,4'-biphthalic dianhydride (BPDA), 4,4'-bisphenol A dianhydride (BPADA), p-phenylene bis(trimellitate) dianhydride (TAHQ), hydroquinnone diphtalic anhydride (HQDA), bicyclo[2.2.2]oct-7-ene-2,3,5,6-tetracarboxylic dianhydride (B1317), or a combination thereof.

According to embodiments of the disclosure, the first diamine can be

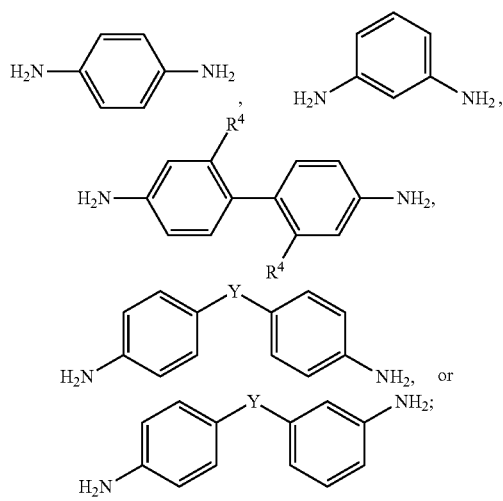

Y can be single bond, —O—, —C(CH$_3$)$_2$—, —C(CF$_3$)$_2$—,

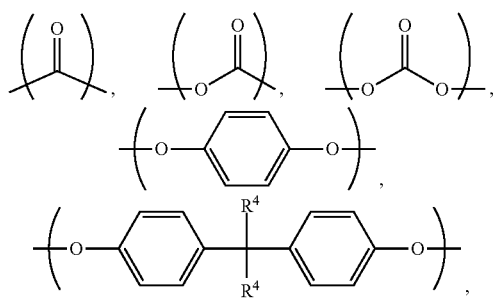

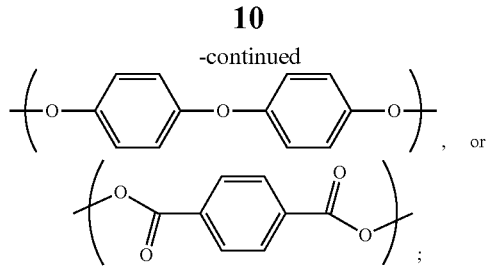

and, $R^4$ can be hydrogen, $C_{1-6}$ alkyl group, or $C_{1-6}$ fluoroalkyl group. According to embodiments of the disclosure, the first diamine compound can be m-tolidine (m-TB), m-phenylenediamine (m-PDA), p-phenylenediamine (p-PDA), 4,4'-oxydianiline (4,4'-ODA), 3,4'-oxydianiline (3,4'-ODA), 1,4-bis(4-aminophenoxy)benzene (1,4-APB), 1,3-bis(4-aminophenoxy)benzene (1,3-APB), 1,2-bis(4-aminophenoxy)benzene (1,2-APB), 1,3-bis(3-aminophenoxy)benzene (APB-133) (2,5-bis(4-aminophenoxy)toluene), bis(4-[4-aminophenoxy]phenyl)ether (BAPE), 4,4'-bis[4-aminophenoxy]biphenyl (BAPB), 2,2-bis[4-(4-aminophenoxy)]phenyl propane (BAPP), bis-(4-(4-aminophenoxy)phenyl sulfone (BAPS), 2,2'-bis (trifluoromethyl) 4,4'-diaminobiphenyl (TFMB), 2,2-bis(3-amino-4-hydroxyphenyl)hexafluoropropane (BAHF), or a combination thereof.

According to embodiments of the disclosure, the second diamine can have a structure represented by

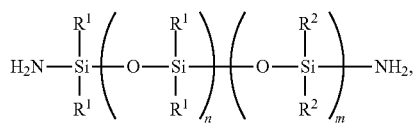

wherein $R^1$, $R^2$, n, and m are the same as defined above. According to embodiments of the disclosure, the molecular weight of second diamine can be 500 to 3,000.

According to embodiments of the disclosure, the solvent is not limited and can be xylene, toluene, tetramethylbenzene, methyl isobutyl ketone, methyl ethyl ketone, ethyl lactate, cyclohexenone, N-methyl-2-pyrrolidone (NMP), methyl ethyl ketone (MEK), N,N-dimethylacetamide (DMAc), γ-butyrolactone (GBL), N,N-Dimethylformamide (DMF), dimethyl sulfoxide (DMSO) or a combination thereof.

According to embodiments of the disclosure, the disclosure also provides a composition used for preparing polysiloxane-polyimide material. The composition of the disclosure can include aforementioned polymer and a crosslinking agent. According to embodiments of the disclosure, the amount of polymer can be 100 parts by weight, and the amount of crosslinking agent can be about 5-40 parts by weight, such as 10 parts by weight, 15 parts by weight, 20 parts by weight, 25 parts by weight, 30 parts by weight, or 35 parts by weight. When the amount of crosslinking agent is too low, the network crosslinking structure exhibits insufficient cross-linking degree, thereby reducing the hardness and Young's modulus of the cured product of the composition. When the amount of crosslinking agent is too high, the network crosslinking structure exhibits too high cross-linking degree, thereby reducing the ductility and the flexibility of the cured product of the composition.

According to embodiments of the disclosure, the crosslinking agent can be polyol (such as dihydric alcohol, trihydric alcohol, or tetrahydric alcohol), a compound having at least two acrylate groups or methacrylate groups, or a combination thereof.

According to embodiments of the disclosure, the cross-linking agent can be 1,3-propanediol, 2,3,4-trimethyl-1,3-pentanediol, 2-butene-1,4-diol, 1,4-butanediol, 1,3-butanediol, 1,5-pentanediol, 1,6-hexanediol, 1,2-cyclohexanedimethanol, 1,2-hexanediol, 1,3-hexanediol, 2-methyl-1,3-propanediol, 2,5-hexanediol, 2-methyl-1,3-pentanediol, 2-methyl-2,4-pentanediol, ethylene glycol, diethylene glycol, triethylene glycol, tetraethylene glycol, polyethylene glycol, propylene glycol, dipropylene glycol, polypropylene glycol, tripropylene glycol, glycerol, polyglycerol, ethylene carbonate, or 1,2-propylene carbonate.

According to embodiments of the disclosure, the cross-linking agent can be dioxane glycol diacrylate, hydroxypivalyl hydroxypivalate diacrylate, 1,6-hexanediol diacrylate, ethoxylated 1,6-hexanediol diacrylate, dipropylene glycol diacrylate, tripropylene glycol diacrylate, tricyclodecane dimethanol diacrylate, polyethylene glycol (200) diacrylate (molecular weight 200), polyethylene glycol (400) diacrylate (molecular weight 400), polyethylene glycol (600) diacrylate (molecular weight 600), polyethylene glycol (200) dimethacrylate (molecular weight 200), polyethylene glycol (400) dimethacrylate (molecular weight 400), polypropylene glycol diacrylate, 2-hydroxyethyl metharcrylate phosphate, neopentyl glycol diacrylate, propoxylated neopentyl glycol diacrylate, ethoxylated bisphenol-A diacrylate, ethoxylated bisphenol-A dimethacrylate, 2-methyl-1,3-propanediol diacrylate, ethoxylated 2-methyl-1,3-propanediol diacrylate, 2-butyl-2-ethyl-1,3-propanediol diacrylate, ethylene glycol dimethacrylate (EGDMA), triethylene glycol dimethacrylate, diethylene glycol dimethacrylate, 1,4-butanediol diacrylate, 1,6-hexanediol dimethacrylate, allylated cyclohexyl dimethacrylate, diethylene glycol dimethacrylate, tris(2-hydroxy ethyl)isocyanurate triacrylate, pentaerythritol triacrylate, ethoxylated trimethylolpropane triacrylate, ethoxylated trimethylolpropane trimethacrylate, propoxylated trimethylolpropane triacrylate, trimethylolpropane trimethacrylate, trimethylolpropane triacrylate, pentaerythritol triacrylate, ethoxylated pentaerythritol triacrylate), propoxylated glycerol triacrylate, propoxylated pentaerythritol triacrylate, pentaerythritol tetraacrylate, ethoxylated pentaerythritol tetraacrylate, propoxylated pentaerythritol tetraacrylate, trimethylolpropane tetracrylate, dipentaerythritol hexaacrylate, or a combination thereof.

According to embodiments of the disclosure, the composition of the disclosure can further include an initiator, such as photo-initiator or thermal initiator. According to embodiments of the disclosure, the amount of initiator is not limited and can be 0.1 parts by weight to 15 parts by weight. According to embodiments of the disclosure, the photo-initiator can be a benzoin-based compound, acetophenone-based compound, thioxanthone-based compound, ketal compound, benzophenone-based compound, α-aminoacetophenone compound, acylphosphineoxide compound, biimidazole-based compound, triazine-based compound or a combination thereof.

The benzoin-based compound, for example, can be benzoin, benzoin methyl ether, benzyl dimethyl ketal, or other suitable benzoin; the acetophenone-based compound can be p-dimethylamino-acetophenone, α,α'-dimethoxyazoxy-acetophenone, 2,2'-dimethyl-2-phenyl-acetophenone, p-methoxy-acetophenone, 2-methyl-1-(4-methylthiophenyl)-2-morpholino-1-propanone, or 2-benzyl-2-N,N-dimethylamino-1-(4-morpholinophenyl)-1-butanone; the benzophenone-based compound can be benzophenone, 4,4-bis(dimethylamino)benzophenone), 4,4-bis(diethylamino)benzophenone), 2,4,6-trimethylaminobenzophenone, methyl-o-benzoyl benzoate, 3,3-dimethyl-4-methoxybenzophenone), or 3,3,4,4-tetra(t-butylperoxycarbonyl)benzophenone; the thioxanthone-based compound can be thioxanthone, 2,4-diethyl-thioxanthanone, thioxanthone-4-sulfone; the biimidazole-based compound can be 2,2'-bis(o-chlorophenyl)-4,4',5,5'-tetraphenyl-biimidazole, 2,2'-bis(o-fluorophenyl)-4,4',5,5'-tetraphenyl-biimidazole, 2,2'-bis(o-methylphenyl)-4,4',5,5'-tetraphenyl-biimidazole, 2,2'-bis(o-methoxyphenyl)-4,4',5,5'-tetraphenyl-biimidazole, 2,2'-bis(o-ethylphenyl)-4,4',5,5'-tetraphenyl-biimidazole, 2,2'-bis(p-methoxyphenyl)-4,4',5,5'-tetraphenyl-biimidazole, 2,2'-bis(2,2',4,4'-tetramethoxyphenyl)-4,4',5,5'-tetraphenyl-biimidazole, 2,2'-bis(2-chlorophenyl)-4,4',5,5'-tetraphenyl-biimidazole, 2,2'-bis(2,4-dichlorophenyl)-4,4',5,5'-tetraphenyl-biimidazole; the acylphosphineoxide can be 2,4,6-trimethylbenzoyl diphenylphosphine oxide or bis(2,6-dimethoxybenzoyl)-2,4,4-trimethylpentylphosphine oxide; the triazine-based compound can be 3-{4-[2,4-bis(trichloromethyl)-s-triazine-6-yl]phenylthio}propionic acid, 1,1,1,3,3,3-hexafluoroisopropyl-3-{4-[2,4-bis(trichloromethyl)-s-triazine-6-yl]phenylthio}propionate, ethyl-2-{4-[2,4-bis(trichloromethyl)-s-triazine-6-yl]phenylthio}acetate, 2-2-epoxyethyl-2-{4-[2,4-bis(trichloromethyl)-s-triazine-6-yl]phenylthio}acetate, cyclohexyl-2-{4-[2,4-bis(trichloromethyl)-s-triazine-6-yl]phenylthio}acetate, benzyl-2-{4-[2,4-bis(trichloromethyl)-s-triazine-6-yl]phenylthio}acetate, 3-{chloro-4-[2,4-bis(trichloromethyl)-s-triazine-6-yl]phenylthio}propionic acid, 3-{4-[2,4-bis(trichloromethyl)-s-triazine-6-yl]phenylthio}propionamide, 2,4-bis(trichloromethyl)-6-p-methoxystyryl-s-triazine, 2,4-bis(trichloromethyl)-6-(1-p-dimethylaminophenyl)-1,3-butadienyl-s-triazine, or 2-trichloromethyl-4-amino-6-p-methoxystyryl-s-triazine.

According to embodiments of the disclosure, the thermal initiator can be azo compound, cyanovaleric-acid-based compound, peroxide or a combination thereof. The azo compound can be 2,2'-azobis(2,4-dimethyl valeronitrile), dimethyl 2,2'-azobis(2-methylpropionate), 2,2-azobisisobutyronitrile (AIBN), 2,2-azobis(2-methylisobutyronitrile), 1,1'-azobis(cyclohexane-1-carbonitrile), 2,2'-azobis[N-(2-propenyl)-2-methylpropionamide], 1-[(cyano-1-methylethyl)azo]formamide, 2,2'-azobis(N-butyl-2-methylpropionamide), 2,2'-azobis(N-cyclohexyl-2-methylpropionamide)), or other suitable azo compound; the peroxide can be benzoyl peroxide, 1,1-bis(tert-butylperoxy)cyclohexane, 2,5-bis(tert-butylperoxy)-2,5-dimethylcyclohexane, 2,5-bis(tert-butylperoxy)-2,5-dimethyl-3-cyclohexyne, bis(1-(tert-butylpeorxy)-1-methy-ethyl)benzene, tert-butyl hydroperoxide, tert-butyl peroxide, tert-butyl peroxybenzoate, cumene hydroperoxide, cyclohexanone peroxide, dicumyl peroxide, lauroyl peroxide, or other suitable peroxide.

According to embodiments of the disclosure, the composition can further include a solvent, wherein the polymer, crosslinking agent, and initiator are uniformly dispersed in the solvent. The solvent can be used to adjusted the viscosity of the composition in order to force that the composition can be coated on a substrate to form a coating by a coating process. The solvent can be any inert solvent that can dissolve or disperse the ingredients of the adhesive composition of the disclosure, but does not react with the ingredients. For example, the solvent, which can dissolve or disperse the ingredients of the adhesive composition, include but are not limited to xylene, toluene, tetramethylbenzene, methyl isobutyl ketone, methyl ethyl ketone, ethyl lactate, cyclohexenone, N-methyl-2-pyrrolidone (NMP), methyl ethyl ketone (MEK), N,N-dimethylacetamide (DMAc), γ-butyrolactone (GBL), N,N-Dimethylformamide (DMF), or dimethyl sulfoxide (DMSO). The solvent can be used alone or in combination. The amount of the solvent is not particularly limited as long as the ingredients of the resin composition can be evenly dissolved or dispersed therein.

According to embodiments of the disclosure, the composition of the disclosure can optionally further include other ingredients (such as additives known by those skilled in the art) in order to improve the physicochemical properties of the cured product of the composition. The conventional additives include, but not limited to, flame retardant, viscosity modifier, thixotropic agent, defoamer, leveling agent, surface treatment agent, stabilizer, ring closing promoter, and antioxidant. The additive can be used alone or in combination. The amount of the additive is not limited and can be optionally modified by a person of ordinary skill in the field.

According to embodiments of the disclosure, the composition of the disclosure only includes the polymer of the disclosure and does not include other organic polymer or inorganic polymer.

According to embodiments of the disclosure, the disclosure also provides a polysiloxane-polyimide material, wherein the polysiloxane-polyimide material is a cured product of the aforementioned composition undergoing a cross-linking reaction. According to embodiments of the disclosure, the method for preparing polysiloxane-polyimide material can include the following steps. First, the composition of the disclosure is provided. Next, the composition is coated on a substrate to form a coating via a coating process. Next, the coating is subjected to a curing process to undergo a cross-linking reaction, forming a film (i.e. polysiloxane-polyimide film). The curing process can be performed at a temperature about 80° C.-220° C., and the process time period can be 30 minutes to 4 hours. In addition, before subjecting the coating to the curing process, the coating can be baked to remove the solvent of the resin composition. During the curing process of the composition, since the polysiloxane segment of the polymer has reactive functional groups, the polymer can reactive with the cross-linking agent to undergo a cross-linking reaction to form a network crosslinking structure, obtaining a polysiloxane-polyimide film with high transparency, high rigidity, high hardness, and high flexibility. According to embodiments of the disclosure, the suitable coating technique of the composition includes screen printing, spin coating, bar coating, blade coating, roller coating, dip coating, spray coating, or brush coating. The material of the substrate is not limited and can be a resin polymer, fiber, silicon substrate, glass, metal, or transparent connecting film, and any desired layer can be formed on the substrate at first.

In addition, the polysiloxane-polyimide material is a film by way of illustration, and the application of the polysiloxane-polyimide material of the disclosure is not limited. The polysiloxane-polyimide material may also serve as a material of coating, fiber, foam plastic, photoresist, alignment agent for liquid crystal display, waveguide material, or optical switch.

Below, exemplary embodiments will be described in detail so as to be easily realized by a person having ordinary knowledge in the art. The inventive concept may be embodied in various forms without being limited to the exemplary embodiments set forth herein.

EXAMPLES

Preparation of Composition

Example 1

4,4'-(hexafluoroisopropylidene)-diphthalic anhydride (6FDA) (50 parts by mole), bicyclo[2.2.2]oct-7-ene-2,3,5,6-tetracarboxylic dianhydride (B1317) (50 parts by mole), 2,2'-bis(trifluoromethyl) 4,4'-diaminobiphenyl (TFMB) (90 parts by mole), polysiloxane diamine (with a structure of

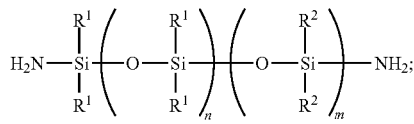

n>1; m>1; n:m was 6:4; $R^1$ was —$CH_3$; and $R^2$ was acrylate group, another $R^2$ was —$CH_3$) (with a molecular weight about 1280) (10 parts by mole), and γ-butyrolactone (GBL) was added into a reaction bottle, obtaining a solution (with a solid content about 5 wt %). Next, the aforementioned solution was reacted at 220° C. for 4 hours, obtaining a solution having the polymer of the disclosure. Next, the crosslinking agent (pentaerythritol triacrylate) (with a trade number of ARONIX M-306 commercially available from Toagosei Co., Ltd produces) (10 parts by mole) was added into the solution having the polymer of the disclosure, obtaining Composition (1).

Example 2

Example 2 was performed in the same manner as in Example 1, except that the amount of TFMB was reduced from 90 parts by mole to 80 parts by mole, and the amount of polysiloxane diamine was increased from 10 parts by mole to 20 parts by mole, obtaining Composition (2).

Example 3

Example 3 was performed in the same manner as in Example 2, except that the amount of crosslinking agent was increased from 10 parts by mole to 20 parts by mole, obtaining Composition (3).

Example 4

Example 4 was performed in the same manner as in Example 2, except that the amount of crosslinking agent was increased from 10 parts by mole to 30 parts by mole, obtaining Composition (4).

Example 5

4,4'-(hexafluoroisopropylidene)-diphthalic anhydride (6FDA) (50 parts by mole), bicyclo[2.2.2]oct-7-ene-2,3,5,6-tetracarboxylic dianhydride (B1317) (50 parts by mole), 2,2'-bis(trifluoromethyl) 4,4'-diaminobiphenyl (TFMB) (80 parts by mole), polysiloxane diamine (with a structure of

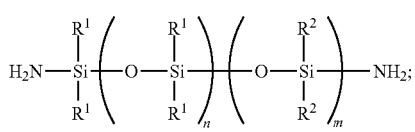

n>1; m>1; n:m was 6:4; $R^1$ was —$CH_3$; and $R^2$ was acrylate group, another $R^2$ was —$CH_3$) (with a molecular weight about 1280) (20 parts by mole), and γ-butyrolactone (GBL) was added into a reaction bottle, obtaining a solution (with a solid content about 5 wt %). Next, the aforementioned solution was reacted at 220° C. for 4 hours, obtaining a solution having the polymer of the disclosure. Next, the crosslinking agent (polypropylene glycol diacrylate) (with a trade number of ARONIX M-225, commercially available from Toagosei Co., Ltd produces) (20 parts by mole) was added into the solution having the polymer of the disclosure, obtaining Composition (5).

Comparative Example 1

4,4'-(hexafluoroisopropylidene)-diphthalic anhydride (6FDA) (50 parts by mole), bicyclo[2.2.2]oct-7-ene-2,3,5,6-tetracarboxylic dianhydride (B1317) (50 parts by mole), 2,2'-bis(trifluoromethyl) 4,4'-diaminobiphenyl (TFMB) (100 parts by mole), and γ-butyrolactone (GBL) was added into a reaction bottle, obtaining a solution (with a solid content about 5 wt %). Next, the aforementioned solution was reacted at 220° C. for 4 hours, obtaining Composition (6).

Comparative Example 2

4,4'-(hexafluoroisopropylidene)-diphthalic anhydride (6FDA) (50 parts by mole), bicyclo[2.2.2]oct-7-ene-2,3,5,6-tetracarboxylic dianhydride (B1317) (50 parts by mole), 2,2'-bis(trifluoromethyl) 4,4'-diaminobiphenyl (TFMB) (100 parts by mole), and γ-butyrolactone (GBL) was added into a reaction bottle, obtaining a solution (with a solid content about 5 wt %). Next, after reacting the aforementioned solution at 220° C. for 4 hour, the crosslinking agent (pentaerythritol triacrylate) (with a trade number of ARONIX M-306 commercially available from Toagosei Co., Ltd produces) (30 parts by mole) was added into the solution, obtaining Composition (7).

Comparative Example 3

Comparative Example 3 was performed in the same manner as in Comparative Example 2, except that crosslinking agent was increased from 30 parts by mole to 50 parts by mole, obtaining Composition (8).

Comparative Example 4

Comparative Example 4 was performed in the same manner as in Example 2, except that crosslinking agent was increased from 10 parts by mole to 50 parts by mole, obtaining Composition (9).

Comparative Example 5

Comparative Example 5 was performed in the same manner as in Example 3, except that the amount of TFMB was reduced from 80 parts by mole to 70 parts by mole, and the amount of polysiloxane diamine was increased from was increased from 20 parts by mole to 30 parts by mole, obtaining Composition (10).

Comparative Example 6

Comparative Example 6 was performed in the same manner as in Example 3, except that the amount of TFMB was reduced from 80 parts by mole to 60 parts by mole, and the amount of polysiloxane diamine was increased from 20 parts by mole to 40 parts by mole, obtaining Composition (11).

Next, Compositions (1)-(11) of Examples 1-5 and Comparative Examples 1-6 were coated on a glass by blade coating individually, obtaining coatings (with a thickness about 20 μm). Next, the coatings were baked at 80° C.-220° C. for 30 minutes to 4 hours such that the coatings underwent a cross-linking reaction and were cured, obtaining films. Next, the light transmittance, Young's modulus, elongation rate, and hardness of the film were measured and the flexibility of the film was determined, and the results are shown in Table 1. The light transmittance was measured by the method according to ASTM D1746. Young's modulus was measured by the method according to ASTM D882-12. The elongation rate was measured by the method according to ASTM D412 by universal tensile machine. The hardness was measured by the method according to ASTM D2240 determined. The flexibility was determined by taking opposite corners of the films, and folding them. After repeating the above step 10 times, the test was marked with O when the presence of cracks was observed. Otherwise, it was marked with X.

TABLE 1

|  | light transmittance (%) | Young's modulus (Gpa) | elongation rate | hardness | flexibility |
|---|---|---|---|---|---|
| Example 1 | ~90 | 2.8 | 8.3 | 4B | O |
| Example 2 | ~90 | 3.4 | 9.0 | 5B | O |
| Example 3 | ~90 | 3.8 | 8.5 | 4B | O |
| Example 4 | ~90 | 4.0 | 8.2 | 3B | O |
| Example 5 | ~90 | 3.2 | 7.5 | 5B | O |
| Comparative Example 1 | ~90 | 2.5 | 5.2 | ~6B | O |
| Comparative Example 2 | ~90 | 3.6 | 2.3 | 4B | X |
| Comparative Example 3 | broken when peeling it from the glass (non-flexible) | | | | |
| Comparative Example 4 | ~90 | 4.5 | 2.2 | 3B | X |
| Comparative Example 5 | ~90 | 3.4 | 10.6 | >6B | O |
| Comparative Example 6 | ~90 | 3.0 | 17.5 | ~6B | O |

As shown in Table 1, when the number ratio of the first repeating unit and the second repeating unit of the polymer of the disclosure (i.e. the molar ratio of TFMB to polysiloxane diamine) was 95:5 to 75:25, the film prepared from the composition employing the polymer (i.e. the compositions of Examples 1-5) via crosslinking reaction can exhibits high light transmittance, suitable Young's modulus, suitable elongation rate, higher hardness and flexibility. In addition, when the polymer only has the first repeating unit (i.e. the polymer was prepared in the absence of polysiloxane diamine) (Comparative Examples 2-3), the film prepared from the aforementioned composition exhibits poor flexibility since the polymer does not have the second repeating unit of the disclosure. In addition, the film prepared from the composition exhibits a poor Young's modulus and hardness, when the composition (i.e. Comparative Example 1) is in the absence of a crosslinking agent. The film prepared from the composition exhibits a poor elongation rate and flexibility, when the amount of crosslinking agent in the composition is excessive (i.e. Comparative Example 4). Furthermore, when the number ratio of the first repeating unit to second repeating unit (i.e. the molar ratio of TFMB to polysiloxane diamine) is less than 75:25, the film prepared from the composition employing the same via the crosslinking reaction (i.e. the compositions of Comparative Examples 1-5) exhibits clearly reduced mechanical strength.

Example 6

4,4'-(hexafluoroisopropylidene)-diphthalic anhydride (6FDA) (50 parts by mole), bicyclo[2.2.2]oct-7-ene-2,3,5,6-tetracarboxylic dianhydride (B1317) (50 parts by mole), 2,2'-bis(trifluoromethyl) 4,4'-diaminobiphenyl (TFMB) (80 parts by mole), polysiloxane diamine (with a structure of

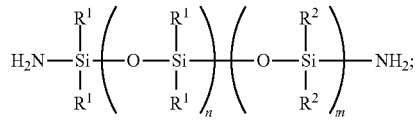

$n>1$; $m>1$; n:m was 6:4; R was $-CH_3$ or $-C_6H_5$; and $R^2$ was acrylate group, another $R^2$ was $-CH_3$) (with a molecular weight about 1520) (20 parts by mole), and γ-butyrolactone (GBL) was added into a reaction bottle, obtaining a solution (with a solid content about 5 wt %). Next, the aforementioned solution was reacted at 220° C. for 4 hours, obtaining a solution having the polymer of the disclosure. Next, the crosslinking agent (pentaerythritol triacrylate) (with a trade number of ARONIX M-306 commercially available from Toagosei Co., Ltd produces) (20 parts by mole) was added into the solution having the polymer of the disclosure, obtaining Composition (12).

Example 7

4,4'-(hexafluoroisopropylidene)-diphthalic anhydride (6FDA) (50 parts by mole), bicyclo[2.2.2]oct-7-ene-2,3,5,6-tetracarboxylic dianhydride (B1317) (50 parts by mole), 2,2'-bis(trifluoromethyl) 4,4'-diaminobiphenyl (TFMB) (80 parts by mole), polysiloxane diamine (with a structure of

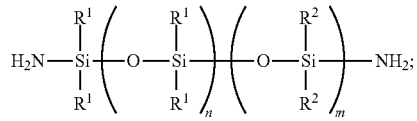

$n>1$; $m>1$; n:m was 6:4; R was $-CH_3$ or $-C_6H_5$; and $R^2$ was an alkyl group with an isocyanate substituted group, another $R^2$ was $-CH_3$) (with a molecular weight about 2370) (20 parts by mole), and γ-butyrolactone (GBL) was added into a reaction bottle, obtaining a solution (with a solid content about 5 wt %). Next, the aforementioned solution was reacted at 220° C. for 4 hours, obtaining a solution having the polymer of the disclosure. Next, the crosslinking agent (2-methyl-1,3-propanediol) (20 parts by mole) was added into the solution having the polymer of the disclosure, obtaining Composition (13).

Comparative Example 7

4,4'-(hexafluoroisopropylidene)-diphthalic anhydride (6FDA) (50 parts by mole), bicyclo[2.2.2]oct-7-ene-2,3,5,6-tetracarboxylic dianhydride (B1317) (50 parts by mole), 2,2'-bis(trifluoromethyl) 4,4'-diaminobiphenyl (TFMB) (80 parts by mole), polysiloxane diamine (with a structure of

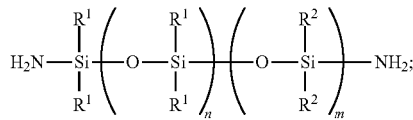

$n>1$; $m>1$; n:m was 6:4; R was $-CH_3$ or $-C_6H_5$; and $R^2$ was acrylate group, another $R^2$ was $-CH_3$) (with a molecular weight about 6300) (20 parts by mole), and γ-butyrolactone (GBL) was added into a reaction bottle, obtaining a solution (with a solid content about 5 wt %). Next, the aforementioned solution was reacted at 220° C. for 4 hours, obtaining a solution having the polymer of the disclosure. Next, the crosslinking agent (pentaerythritol triacrylate) (with a trade number of ARONIX M-306 commercially available from Toagosei Co., Ltd produces) (20 parts by mole) was added into the solution having the polymer of the disclosure, obtaining Composition (14).

Next, Compositions (12)-(14) of Examples 6-7 and Comparative Example 7 were coated on a glass by blade coating individually, obtaining coatings (with a thickness about 20 μm). Next, the coatings were baked at 80° C.-220° C. for 30 minutes to 4 hours such that the coatings underwent a cross-linking reaction and were cured, obtaining films. Next, the light transmittance, Young's modulus, elongation rate, and hardness of the film were measured and the flexibility of the film was determined, and the results are shown in Table 2.

TABLE 2

| | light transmittance (%) | Young's modulus (Gpa) | elongation rate | hardness | flexibility |
|---|---|---|---|---|---|
| Example 6 | ~90 | 3.6 | 9.0 | 4B | O |
| Example 7 | ~90 | 3.0 | 8.3 | 5B | O |
| Comparative Example 7 | ~90 | 2.9 | 19.3 | ~6B | O |

As shown in Table 2, when the molecular weight of polysiloxane diamine is greater than 3,000 (i.e. molecular weight of polysiloxane moiety of the second repeating unit of the polymer is greater than 3,000), the film prepared from the composition (i.e. the composition of Comparative Example 7) via crosslinking reaction exhibits clearly reduced mechanical strength (such as hardness).

Example 8

Example 8 was performed in the same manner as in Example 6, except that 4,4'-(hexafluoroisopropylidene)-diphthalic anhydride (6FDA) (50 parts by mole) was replaced with TA-TFMB (with a structure of

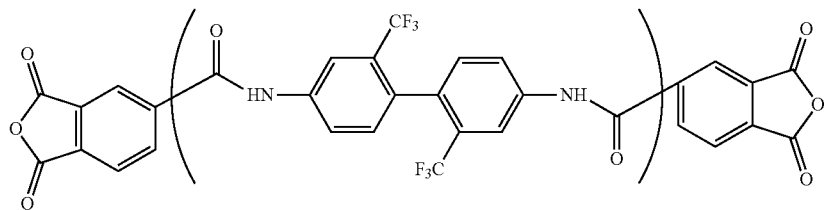

(50 parts by mole), obtaining Composition (15).

Example 9

Example 9 was performed in the same manner as in Example 8, except that bicyclo[2.2.2]oct-7-ene-2,3,5,6-tetracarboxylic dianhydride (B1317) (50 parts by mole) was replaced with hydrogenated pyromellitic dianhydride (H-PMDA) (50 parts by mole), obtaining Composition (16).

Next, Compositions (15)-(16) of Examples 8-9 were coated on a glass by blade coating individually, obtaining coatings (with a thickness about 20 μm). Next, the coatings were baked at 80° C.-220° C. for 30 minutes to 4 hours such that the coatings underwent a cross-linking reaction and were cured, obtaining films. Next, the light transmittance, Young's modulus, elongation rate, and hardness of the film were measured and the flexibility of the film was determined, and the results are shown in Table 3.

TABLE 3

|  | light transmittance (%) | Young's modulus (Gpa) | elongation rate | hardness | flexibility |
|---|---|---|---|---|---|
| Example 8 | ~89 | 5.5 | 7.8 | H | O |
| Example 9 | ~90 | 6.2 | 5.4 | 2H | O |

As shown in Table 3, the polymers prepared from various dianhydride compounds of the disclosure are suitable to be employed by the composition of the disclosure.

It will be clear that various modifications and variations can be made to the disclosed methods and materials. It is intended that the specification and examples be considered as exemplary only, with the true scope of the disclosure being indicated by the following claims and their equivalents.

What is claimed is:

1. A polymer, which comprises a first repeating unit and a second repeating unit, wherein the first repeating unit has a structure represented by Formula (I), and the second repeating unit has a structure represented by Formula (II):

Formula (I)

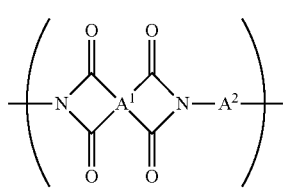

-continued

Formula (II)

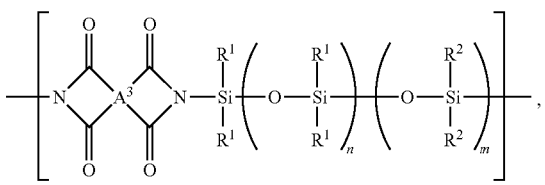

wherein $A^1$ and $A^3$ are independently substituted or non-substituted tetravalent $C_6$-$C_{25}$ aryl group, tetravalent $C_4$-$C_8$ cycloalkyl group, tetravalent $C_5$-$C_{25}$ heteroaryl group, tetravalent $C_7$-$C_{25}$ alkylaryl group, tetravalent $C_7$-$C_{25}$ acylaryl group, tetravalent $C_6$-$C_{25}$ aryl ether group, tetravalent $C_7$-$C_{25}$ acyloxyaryl group, or tetravalent $C_6$-$C_{25}$ sulfonylaryl; $A^2$ is substituted or non-substituted $C_6$-$C_{25}$ arylene group, $C_4$-$C_8$ cycloalkylene group, $C_5$-$C_{25}$ heteroarylene group, divalent $C_7$-$C_{25}$ alkylaryl group, divalent $C_7$-$C_{25}$ acylaryl group, divalent $C_6$-$C_{25}$ aryl ether group, divalent $C_7$-$C_{25}$ acyloxyaryl group, or divalent $C_6$-$C_{25}$ sulfonylaryl; n≥1; m≥1; $R^1$ is independently hydrogen, $C_{1-8}$ alkyl group, $C_{1-8}$ fluoroalkyl group, $C_{1-8}$ alkoxy group, or $C_{6-12}$ aryl group; $R^2$ is independently hydrogen, $C_{1-8}$ alkyl group, $C_{1-8}$ fluoroalkyl group, $C_{1-8}$ alkoxy group, $C_{6-12}$ aryl group, amine group, $C_{2-8}$ carboxyl group, aminoalkyl group, $C_{2-8}$ isocyanate group, alkylamino group, $C_{3-8}$ acrylate group, $C_{4-9}$ methacrylate group, glycidyl group, oxiranyl group, oxetanyl group, or 3,4-epoxy-cyclohexyl group; and, at least two $R^2$ are hydroxyl group, amine group, $C_{2-8}$ carboxyl group, aminoalkyl group, $C_{2-8}$ isocyanate group, alkylamino group, $C_{3-8}$ acrylate group, $C_{4-9}$ methacrylate group, glycidyl group, oxiranyl group, oxetanyl group, or 3,4-epoxy-cyclohexyl group.

2. The polymer as claimed in claim 1, wherein the first repeating unit and the second repeating unit are arranged in a random or block fashion.

3. The polymer as claimed in claim 1, wherein $A^1$ and $A^3$ are independently

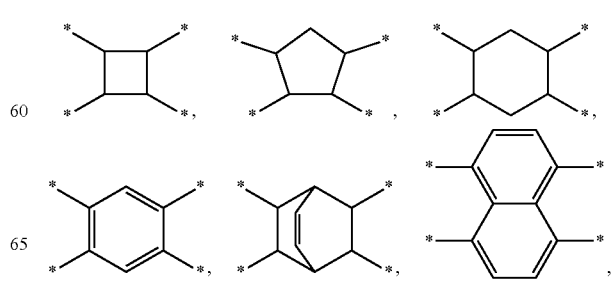

-continued

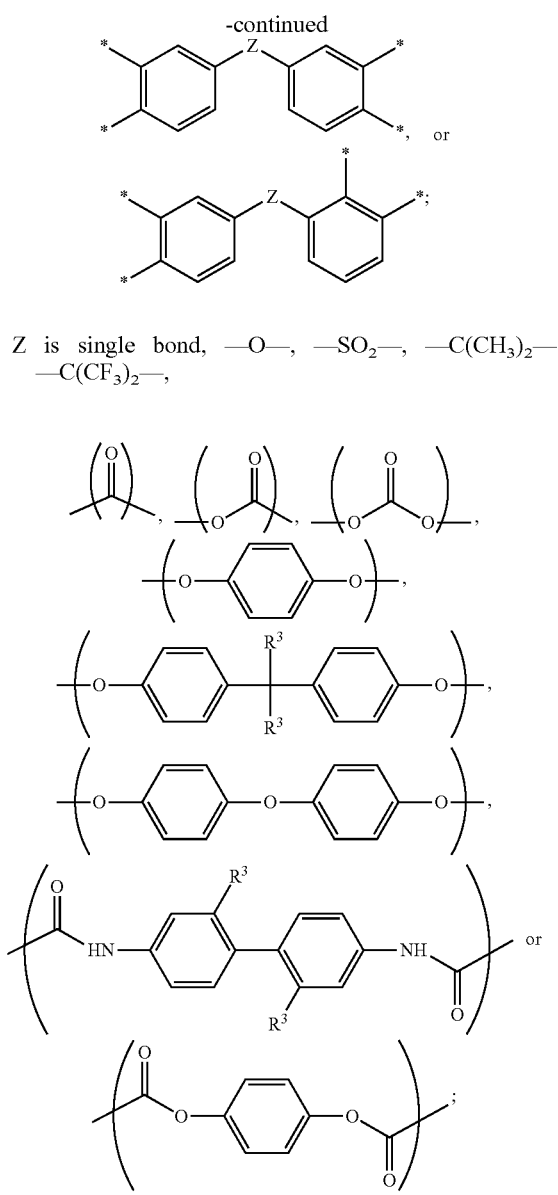

Z is single bond, —O—, —SO$_2$—, —C(CH$_3$)$_2$—, —C(CF$_3$)$_2$—, and R$^3$ is hydrogen, fluorine C$_{1-6}$ alkyl group, or C$_{1-6}$ fluoroalkyl group.

4. The polymer as claimed in claim 1, wherein A$^2$ is

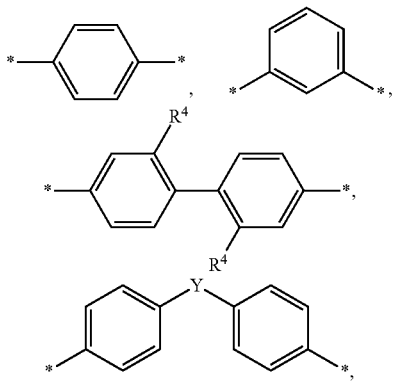

-continued

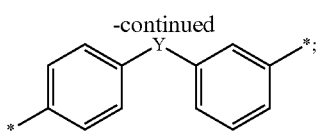

Y is single bond, —O—, —C(CH$_3$)$_2$—, —C(CF$_3$)$_2$—,

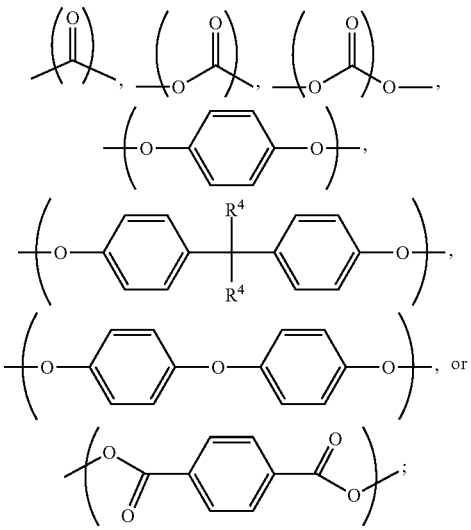

and, R$^4$ is hydrogen, fluorine C$_{1-6}$ alkyl group, or C$_{1-6}$ fluoroalkyl group.

5. The polymer as claimed in claim 1, wherein the number ratio of the first repeating unit to the second repeating unit is 95:5 to 75:25.

6. The polymer as claimed in claim 1, wherein, in the second repeating unit, the moiety of

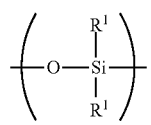

and the moiety of

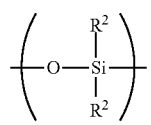

are arranged in a random fashion.

7. The polymer as claimed in claim 1, wherein, in the second repeating unit, the moiety of

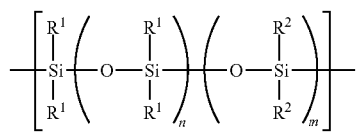

has a molecular weight of 500 to 3,000.

8. The polymer as claimed in claim 1, wherein the ratio of n to m is 3:2 to 99:1.

9. A composition, comprising:
    100 parts by weight of the polymer as claimed in claim 1; and
    5-40 parts by weight of a crosslinking agent.

10. The composition as claimed in claim 9, wherein the crosslinking agent is polyol, a compound having at least two acrylate groups or methacrylate groups, or a combination thereof.

11. The composition as claimed in claim 9, wherein the crosslinking agent is 1,3-propanediol, 2,3,4-trimethyl-1,3-pentanediol, 2-butene-1,4-diol, 1,4-butanediol, 1,3-butanediol, 1,5-pentanediol, 1,6-hexanediol, 1,2-cyclohexanedimethanol, 1,2-hexanediol, 1,3-hexanediol, 2-methyl-1,3-propanediol 2,5-hexanediol, 2-methyl-1,3-pentanediol, 2-methyl-2,4-pentanediol, ethylene glycol, diethylene glycol, triethylene glycol, tetraethylene glycol, polyethylene glycol, propylene glycol, dipropylene glycol, polypropylene glycol, tripropylene glycol, glycerol, polyglycerol, ethylene carbonate, or 1,2-propylene carbonate.

12. The composition as claimed in claim 9, wherein the crosslinking agent is dioxane glycol diacrylate, hydroxypivalyl hydroxypivalate diacrylate, 1,6-hexanediol diacrylate, ethoxylated 1,6-hexanediol diacrylate, dipropylene glycol diacrylate, tripropylene glycol diacrylate, tricyclodecane dimethanol diacrylate, polyethylene glycol (200) diacrylate (molecular weight 200), polyethylene glycol (400) diacrylate (molecular weight 400), polyethylene glycol (600) diacrylate (molecular weight 600), polyethylene glycol (200) dimethacrylate (molecular weight 200), polyethylene glycol (400) dimethacrylate (molecular weight 400), 2-hydroxyethyl metharcrylate phosphate, neopentyl glycol diacrylate, propoxylated neopentyl glycol diacrylate, ethoxylated bisphenol-A diacrylate, ethoxylated bisphenol-A dimethacrylate, 2-methyl-1,3-propanediol diacrylate, ethoxylated 2-methyl-1,3-propanediol diacrylate, 2-butyl-2-ethyl-1,3-propanediol diacrylate, ethylene glycol dimethacrylate (EGDMA), triethylene glycol dimethacrylate, diethylene glycol dimethacrylate, 1,4-butanediol diacrylate, 1,6-hexanediol dimethacrylate, allylated cyclohexyl dimethacrylate, diethylene glycol dimethacrylate, tris(2-hydroxyethyl)isocyanurate triacrylate, pentaerythritol triacrylate, ethoxylated trimethylolpropane triacrylate, ethoxylated trimethylolpropane trimethacrylate, propoxylated trimethylolpropane triacrylate, trimethylolpropane trimethacrylate, trimethylolpropane triacrylate, pentaerythritol triacrylate, ethoxylated pentaerythritol triacrylate), propoxylated glycerol triacrylate, propoxylated pentaerythritol triacrylate, pentaerythritol tetraacrylate, ethoxylated pentaerythritol tetraacrylate, propoxylated pentaerythritol tetraacrylate, trimethylolpropane tetracrylate, dipentaerythritol hexaacrylate, or a combination thereof.

13. The composition as claimed in claim 9, further comprising:
    0.1-15 parts by weight of an initiator.

14. A polysiloxane-polyimide material, which is a cured product of the composition as claimed in claim 9.

* * * * *